United States Patent [19]

Mills, Jr. et al.

[11] Patent Number: 5,144,812
[45] Date of Patent: Sep. 8, 1992

[54] OUTDOOR FAN CONTROL FOR VARIABLE SPEED HEAT PUMP

[75] Inventors: Eugene L. Mills, Jr.; James P. Sodo, both of Indianapolis, Ind.; John M. Palmer, Syracuse; Peter G. Pierret, Fayetteville, both of N.Y.

[73] Assignee: Carrier Corporation, Syracuse, N.Y.

[21] Appl. No.: 709,514

[22] Filed: Jun. 3, 1991

[51] Int. Cl.⁵ ............................................. F25B 49/00
[52] U.S. Cl. ..................................... 62/186; 62/228.4
[58] Field of Search ...................... 62/183, 186, 228.4

[56] References Cited

U.S. PATENT DOCUMENTS

| | | | |
|---|---|---|---|
| 3,276,220 | 10/1966 | Miner | 62/186 X |
| 3,384,801 | 5/1968 | Rodgers | 62/186 |
| 4,315,413 | 2/1982 | Baker | 62/186 X |
| 4,507,936 | 4/1985 | Yoshino | 62/183 X |
| 5,036,676 | 8/1991 | Dudley | 62/228.4 |
| 5,050,394 | 9/1991 | Dudley et al. | 62/183 |
| 5,052,186 | 10/1991 | Dudley et al. | 62/228.4 X |
| 5,054,294 | 10/1991 | Dudley | 62/228.4 |

Primary Examiner—John Rivell

[57] ABSTRACT

In an outdoor unit of a heat pump having a variable speed compressor, the fan speed is controlled in response to both the speed of the compressor and the temperature of the outdoor refrigerant such that the operating efficiency of the fan and its driving motor can be optimized over a full range of compressor operating speeds.

7 Claims, 5 Drawing Sheets

OUTDOOR FAN CONTROL FOR VARIABLE SPEED HEAT PUMP

BACKGROUND OF THE INVENTION

This invention relates generally to air conditioning and heat pump systems and, more particularly, to a method and apparatus for optimizing the outdoor air flow for overall system efficiency and reliability.

In the design of air conditioning and heat pumps systems, it is common practice to use an outdoor fan motor equipped to operate at one or two speeds. As such, the design is performance and efficiency optimized at specific operating conditions. While performance at other operating conditions is not as efficient, it has generally been considered acceptable on the basis of system design economy.

One problem with such conventional design is that, while the design is economical in terms of first cost, the overall cost of the system, when including operating costs for its lifetime, are substantially increased by these operational characteristics. To elaborate, the speed and the corresponding power consumption of the outdoor fan motor is set at a relatively high level to meet the capacity and efficiency requirements of the system at extremes of outdoor temperature. Systems use the single speed motor to operate at this power consumption rate throughout the operating range even when the higher air flow is not required to meet the system needs. Specifically, at milder outdoor temperatures, for either heating or cooling, less air flow is required to perform the work required on the coil, than that required at the extreme temperatures. Similarly, on windy days when the volume of air flowing through the coil is increased by the wind itself, the fan tends to do more work then is necessary. On the other hand, if a condition should exist such that the effectiveness of the coil is diminished, such as a build up of dirt in the coil, or an obstruction in the inlet or discharge path of the air, then the point for which the system has been optimized will no longer be correct for normal optimized operating conditions.

It has long been recognized that there exists a temperature below which the air conditioning or heat pump system can not reliably be used as an air conditioner. Typically these applications involve the cooling of computer rooms where air conditioning may be required at outdoor temperatures down to 0° F. As the lower temperatures are approached, the condensing temperature of the refrigerant in the condenser also drops, and this in turn produces a corresponding reduction in the head pressure on the high pressure side of the refrigeration system. This problem has been addressed by an associated reduction in fan speed in such a manner as described in U.S. Pat. No. 3,196,629 issued on Jul. 27, 1965 and assigned to the assignee of the present invention. It should be recognized that, while this technique does generally function to lower the fan speed with lower temperatures, it only operates in the lower ambient temperature conditions (e.g. below 55° F.) and does little to improve the efficiency of the system. However, the requirements that bring about the use of such a system should be kept in mind when addressing the above problems relating to efficiency.

It is therefore the object of the present invention to provide an air conditioner with improved efficiency.

It is another object of the present invention to optimize the fan air flow delivery rate and motor power consumption over a full range of operation.

Yet another object of the present invention is the provision for optimizing the flow of air over the outdoor coil despite the occurrence of changes in ambient and system operating conditions.

Yet another object of the present invention is the provision for a motor control system that is economical to manufacture and efficient in use.

These objects and other future advantages become more readily apparent upon reference to the following description when taken in conjunction with the appended drawings.

SUMMARY OF THE INVENTION

Briefly, in accordance with one aspect of the invention, the speed of the outdoor fan is controlled as a function of both compressor speed and liquid refrigerant temperature such that the amount of air flowing over the outdoor coil is optimized over the entire operating range of the heat pump. In this way, the outdoor fan motor speed is limited to provide only that air flow necessary to perform the work required of the air conditioner or heat pump at any given set of operating conditions. In doing so, the power consumption of the fan motor is also limited thereby increasing overall system efficiency.

By yet another aspect of the invention, the microprocessor control monitors both compressor speed and liquid refrigerant temperature and continuously recalculates and adjusts the fan speed to maintain optimum operation during normal system heating or cooling modes.

In accordance with another aspect of the invention, at lower ambient temperature conditions, the microprocessor control operates to reduce the fan speed, or to eventually turn the fan off, in order to maintain the head pressure necessary for reliable operation.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
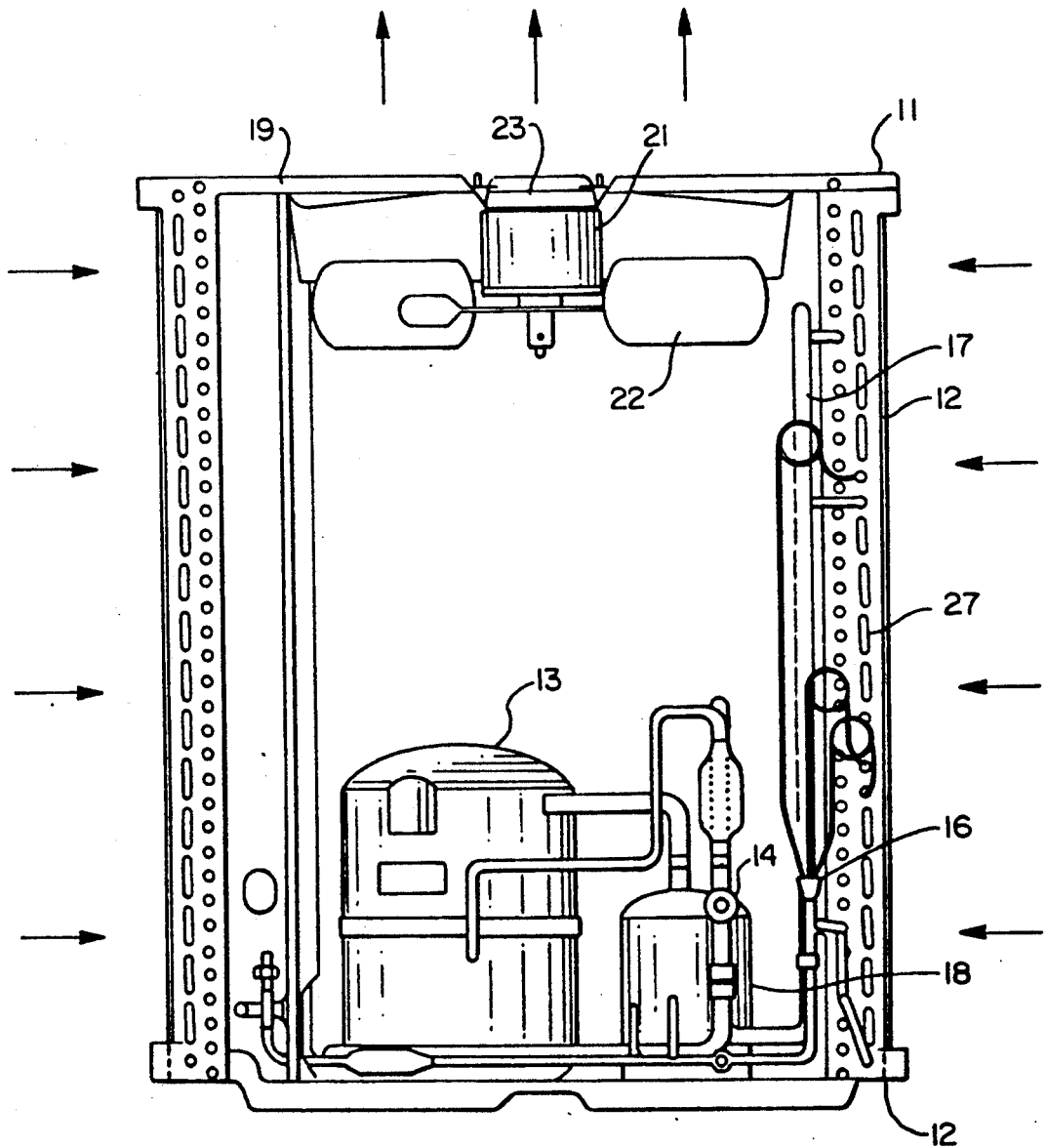
FIG. 1 is a pictorial representation of a heat pump having the present invention incorporated therein.

Referring now to FIG. 1, there is shown a heat pump system 11 of the type with which the present invention is employed. It includes an outdoor coil 12 and a compressor 13 which, along with the outdoor indoor coil and the refrigerant expansion device (not shown), form a refrigeration circuit of the type found in conventional systems.

Also in a conventional manner, a four way valve 14 provides the flexibility of the heat pump to be operated in either the heating or cooling mode by directing the refrigerant to the indoor or outdoor coils respectively. This valve also allows the system to operate in the defrost mode to direct the hot discharge gas to the outdoor coil.

Also forming part of the refrigerant circuit is the liquid distributor 16 and the vapor header 17. When operating in the heating mode, the liquid distributor 16 distributes the liquid refrigerant to the individual circuits of the outdoor coil 12 after it has passed through the expansion device, and the vapor header 17 is a common point at which all of the refrigerant passing through the outdoor coil 12 is combined and passes to the reversing valve 14. In the cooling and defrost modes of operation, the liquid distributor 16 is the common point at which all the refrigerant passing through the outdoor coil 12 is combined and directed to the indoor coil (not shown), and the vapor header 17 distributes the hot discharge gas to the individual circuits of the outdoor coil 12. Finally, also as part of the refrigeration circuit, an accumulator 18 is provided to store excess charge during the heating mode, and to protect the compressor 13 from the liquid slugging during startup.

Referring now to the components that are involved in causing the air to flow through the heat pump 11 by first drawing air radially inwardly through the outdoor coil 12 and then discharging it upwardly, there is provided a louvered top cover 19 from which there is suspended an outdoor fan motor 21 drivingly connected to an outdoor fan propeller 22. In operation during both the cooling and heating modes, the motor 21 drives the fan propeller in such a manner as to draw the ambient air radially inwardly through the outward coil 12 and discharge it upwardly as shown by the arrows in FIG. 1.

Both during the operation in the heating mode, wherein the outdoor coil 12 is functioning as an evaporator, and in the cooling mode, wherein the outdoor coil 12 is functioning as a condenser, it is desirable to selectively vary the speed of the motor 21. This can be accomplished by any of the various ways such with an AC motor being controlled by the operation of an inverter, or by the use of a properly controlled DC motor such as an electrically commutated motor (ECM), which is commercially available from General Electric Company. In one embodiment, the motor 21 is a DC permanent magnet type, preferably with an integrated control 23 integrated into its back cover. Its control package includes a small diode bridge, capacitors and power switching devices, which, in combination converts AC to DC power and then switches the DC power on and off at various ways to control motor speed as a function of sensed parameters and functions as will be described hereinafter. Alternatively, one may provide a discreet control circuitry with inputs going to the motor 21 by way of electrical leads.

Figure 2:
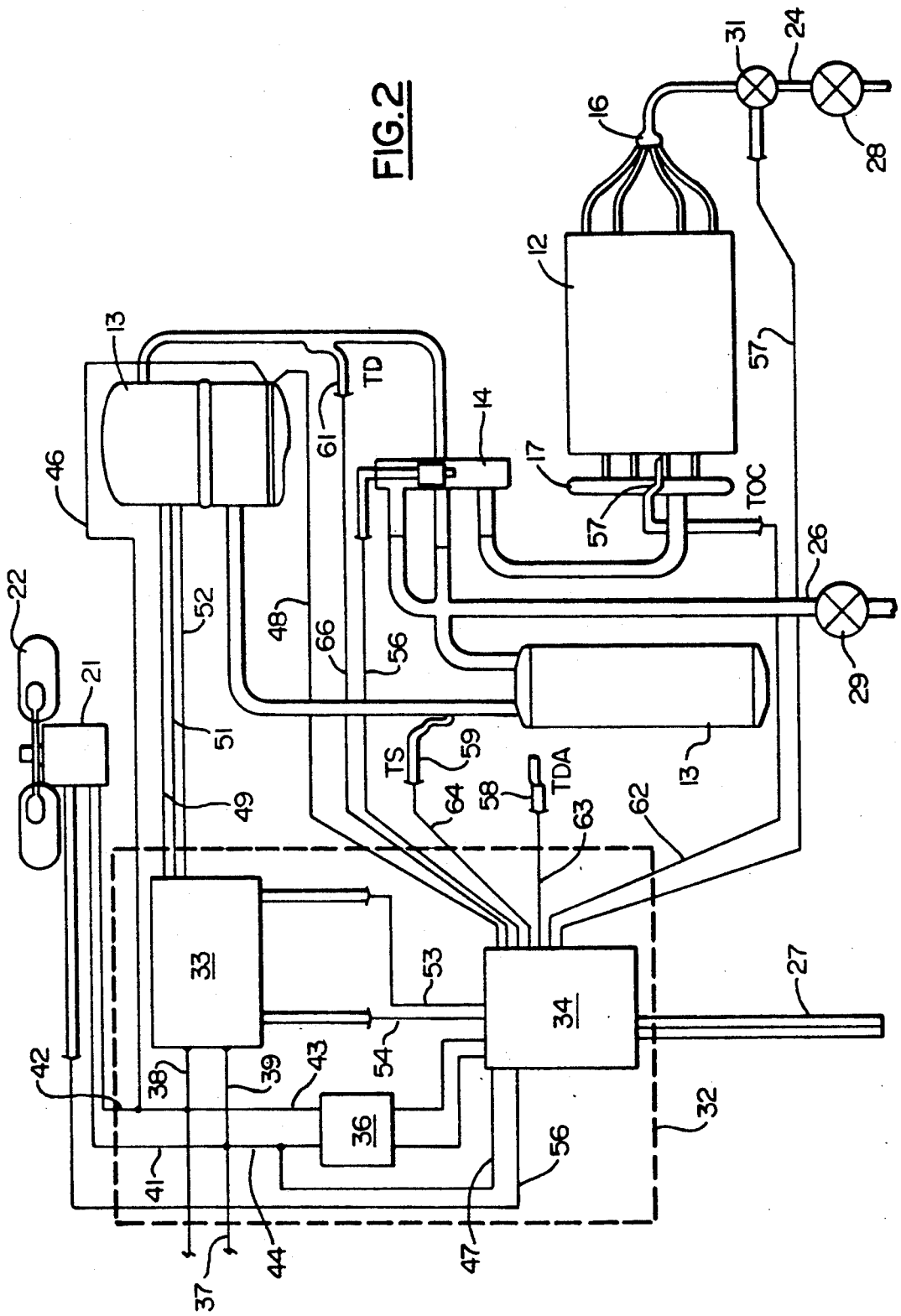
FIG. 2 is a schematic illustration of a heat pump control system in accordance with the present invention.

Referring now to FIG. 2, the outdoor unit is shown schematically to include the control circuitry which is employed to selectively control the speeds of the compressor 13 and the fan motor 21 in response to sensed conditions within the system.

Although an indoor unit is not shown, it will be recognized that the outdoor unit is fluidly and electrically connected to the indoor unit by way of a liquid refrigerant line 24, a vapor refrigerant line 26 and an electrical control bus 27. The liquid service valve 28 and the vapor service valve 29 are provided for making the refrigerant interconnection with the indoor unit. An expansion valve 31, capable of being selectively modulated to vary the orifice size, and thus the degree of liquid refrigerant expansion, is provided in the liquid refrigerant line 24.

A control box is indicated by the dashed lines and the numeral 32. The control box 32 includes an ECM compressor drive package 33, a microprocessor based control module 34, and a main transformer 36. Incoming power to the control box 32 comes from a high voltage power source 37, with the high voltage power then being connected to the ECM compressor drive package 33 by way of leads 38 and 39, to the fan motor 21 by the leads 41 and 42, and to the transformer 36 by leads 43 and 44. Further, high voltage power is provided to the crankcase heater by way of a lead 46, directly connected to one terminal of the crankcase heater, and by way of lead 47, which connects to the microprocessor based control module 34, and lead 48 which connects the microprocessor based control module 34 to the other terminal of the crank case heater. Compressor power is supplied from the ECM compressor drive package 33 by way of leads 49, 51 and 52.

The ECM compressor drive package 33 functions to convert high voltage, single phase AC power to high voltage DC power. It then switches three separate DC output lines on-off, each approximately 120° out of phase with the others, to supply a "three phase" on-off signal to the compressor 13. The rate at which these lines are switched on-off determines the output frequency and therefore the speed of the compressor 13. The compressor has a permanent magnet rotor for increased efficiency.

The switching rate of the ECM compressor drive package 33, and thus the speed of the compressor 13, is determined by a "speed request" from the microprocessor based control module 34 which is provided on line 53. In turn, a low voltage, RPM feedback signal is sent from the ECM compressor drive package 33 to the microprocessor base control module 34 by way of line 54. A control module 34 reads the signal to determine if the compressor is operating at the requested speed, and adjusts its signal to the ECM to obtain the desired speed.

In a similar manner, the microprocessor based control module 34 controls the speed of the fan motor 21 with the same type of PWM signal provided along line 56. In this case, however, there is no feedback signal required since the motor speed control is done internally by the fan motor itself. The motor interprets the PWM signal as a speed request and adjusts itself to provide that speed.

In addition to controlling the speeds of the fan motor 21 and the drive motor for the compressor 13, the control module 34 functions to control the reversing valve 14 and the expansion valve 31. In the case of the reversing valve 14, the control module 34 causes it to be placed either in the heating mode or in the cooling/defrost mode. The expansion valve 31, on the other hand, is caused to be modulated over a range of orifice opening sizes to thereby modulate the flow rate in response to the speed of the compressor 13.

Considering now the inputs to the control module 34, there are four thermistors, 57, 58, 59, and 61 which are employed to monitor the outdoor coil temperature (TOC), the outdoor air temperature (TOA), the suction temperature (TS) and the discharge temperature (TD), respectively. The signals indicative of the outdoor coil temperature (TOC) are sent along lines 62, those of the outdoor air temperature, (TOA) along lines 63, those of the suction temperature (TS) along lines 64, and those for the discharge temperature (TD) on line 66.

Figure 3:
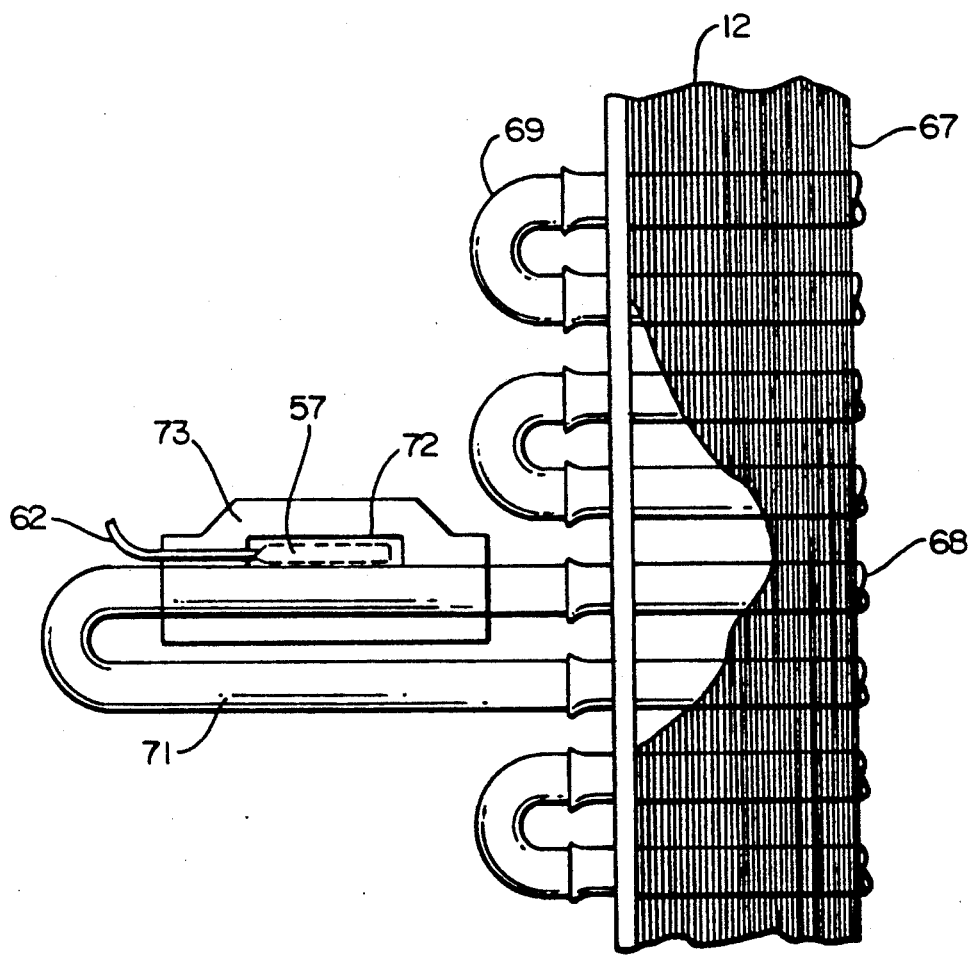
FIG. 3 is a partial view of the outdoor coil portion thereof, together with an installed thermistor.

Referring now to FIG. 3, a portion of the outdoor coil 12 is shown in greater detail to include a conventional detail arrangement of plate fins 67, tubes 68, and return bends 69. In order to employ the fan speed control in accordance with the present invention, it is desirable to monitor the temperature of the refrigerant in the coil 12, which can be accomplished by sensing the temperature of the outdoor coil itself. For that purpose, a standard outdoor coil 12 is modified as shown in FIG. 3.

At some point in the outdoor coil 12, and preferably in the middle of the bottom circuit thereof, the standard return bend 69 is replaced with an extended return bend 71 which allows for the sensing of the temperature in the coil. For that purpose, the thermistor 57 is placed in direct contact with the outer surface of the extended return bend 71 and is held in place by a copper sleeve 72, which is preferably brazed to the extended return bend 71. The copper sleeve/thermistor combination is then surrounded by insulation 73 in order to provide the thermal isolation necessary and for ensuring the desired thermal response of the thermistor 57. Thermistor line 62 then functions to transmit the electric signals representative of resistance change in the thermistor 57 back to the control module 34 as described above.

In response to the outdoor coil temperature TOC as received along lines 62, the compressor speed, as received along line 54, and the particular operating mode (ie. cooling or heating), as received along lines 27, the control module 34 calculates the outdoor fan speed in accordance with the following algorithm:

Fan speed % = $a + b (CS) + c (TOC)$ where:
Fan speed % is the percent of the maximum outdoor fan speed RPM at which the motor is requested to run;
CS is the speed of the compressor normalized to its total speed range;
TOC is the operating temperature of the outdoor coil (equal to the saturated condenser temperature in cooling and the saturated evaporator temperature in heating); and the coefficients a,b, and c are as follows:

|   | Heating | Cooling |
|---|---------|---------|
| a = | 62.677 | −147.882 |
| b = | 65.554 | −11.419 |
| c = | −0.677 | 2.353 |

The coefficients a,b,c, which have been determined on the basis of laboratory testing, which was conducted under conditions that would ensure an outdoor flow which optimizes system performance for any given operating conditions, are system dependent and must be determined for each specific system design.

Using the above algorithm, the control module 34 consistently monitors the above inputs and recalculates and adjusts the fan speed to maintain optimum performance during normal system heating or cooling mode operation. Further, at low temperatures, such as those approaching 0° F., the control module 34 operates to cycle the outdoor fan (or completely turn it off) to maintain the head pressure necessary for reliable operation.

Figure 4:
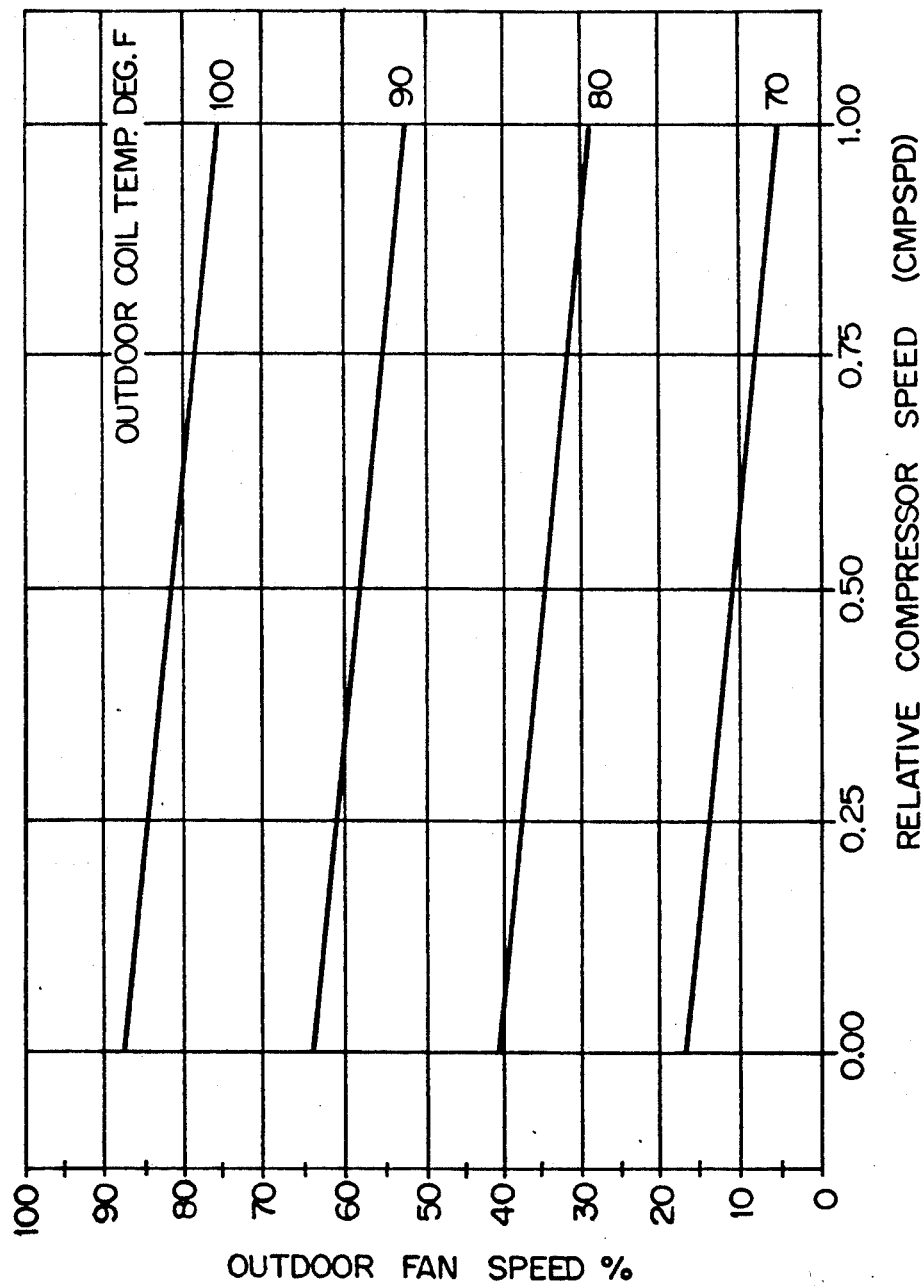
FIG. 4 is a graphic illustration of the outdoor fan speed as controlled in response to changes in the liquid refrigerant temperature during operation in the cooling mode in accordance with the present invention.
Figure 5:
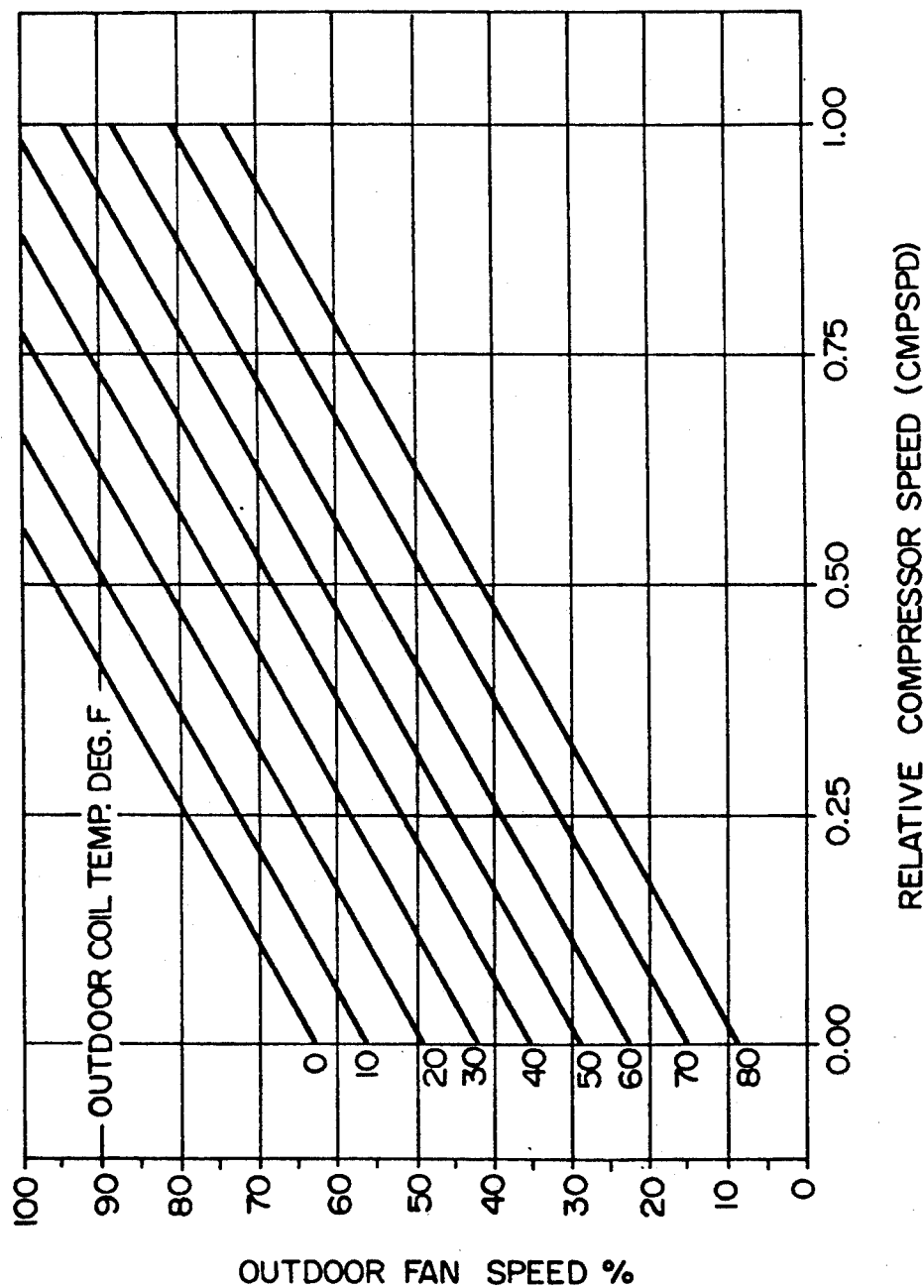
FIG. 5 is a graphic illustration of the outdoor fan speed as controlled in response to changes in the liquid refrigerant temperature during heating operation in accordance with the present invention.

Referring now to FIGS. 4 and 5, the outdoor fan speed is shown as a function of both relative compressor speed (CMPSPD) and of outdoor coil temperature, when using the above algorithm in either the cooling (FIG. 4) or the heating (FIG. 5) mode. It will be seen in FIG. 4 that for any given relative compressor speed (CMPSPD), as the outdoor coil temperature is decreased, as will be caused by such things as lower ambient temperature conditions or windy conditions, the outdoor fan speed is substantially reduced. That is, for a relative compressor speed (CMSPD) of O.5, the fan will be operating at about 82% of its capacity speed when the outdoor coil temperature is at 100° F., whereas it will be operating about 11% of its speed capacity when the outdoor coil temperature is at 70° F.

Similarly, when operating in the heating mode as shown in FIG. 6, it will be seen that at the outdoor coil temperature is increased, the required operating speed of the outdoor fan is substantially reduced. For example, when operating at a relative compressor speed (CMPSPD) of 0.25, the outdoor fan will be caused to operate at about 80% of its speed capacity, whereas when the temperature of the outdoor coil is 80° F., the fan will only to operate at about 25% of its speed capacity.

While the present invention has been disclosed with particular reference to the preferred embodiment, the concepts of this invention are readily adaptable to other embodiments, and those skilled in the art may vary the structure and/or method thereof without departing from the essential spirit of the invention.

What is claim is:

1. An improved outdoor assembly for a heat pump system of the type having a variable speed compressor, an outdoor coil, and a fan with a variable speed motor, comprising;
    sensing means for sensing the speed of the compressor over a range of operating speeds;
    sensing means for sensing the temperature of the refrigerant in the outdoor coil; and
    control means for controlling the speed of the fan in response to both the compressor speed and the refrigerant temperature in such a manner as to optimize the operating efficiency of the fan operation over the full range of operating speeds.

2. An improved heat pump system as set forth in claim when said temperature sensing means comprising a thermistor installed on a surface of tubing within the outdoor coil.

3. An improved outdoor coil as set forth in claim 1 wherein said control means includes means for applying a constant multiplier value to said sensed refrigerant temperature.

4. An improved heat pump system as set forth in claim 1 wherein said control means includes means for applying a constant multiplier value to said compressor speed.

5. An improved heat pump system as set forth in claim 1 wherein said control means controls the speed of the fan in accordance with the following algorithm;

Fan speed % = $a + b (CS) + c (TOC)$ where:
- Fan speed % is the percent of the maximum outdoor fan RPM at which the fan motor is requested to run;
- CS is the speed of the compressor normalized to its total speed range;
- TOC is the operating temperature of the outdoor coil; and
- a, b and c are constants.

6. A method of controlling the fan speed in the heat pump system of a type having a variable speed compressor, an outdoor coil and a variable speed fan motor comprising the steps of:
- sensing the speed of the compressor over a range of operating speeds;
- sensing the temperature of the refrigerant in the outdoor coil; and
- controlling the speed of the fan in response to the both sensed compressor speed and the sensed refrigerant temperature so as to optimize the operating efficiency of the fan operation over the full range of compressor operating speeds.

7. A method of controlling the fan speed in the heat pump system as set forth in claim 6 wherein the step of controlling the speed of the fan is accomplished in accordance with the following algorithm:

$$\text{Fan speed } \% = a + b\ (CS) + c\ (TOC)$$

where:
- Fan speed % is the percent of the maximum outdoor fan speed RPM at which the motor is requested to run;
- CS is the speed of the compressor normalized to its total speed range;
- TOC is the operating temperature of the outdoor coil; and
- a, b and c are constants.

* * * * *